UNITED STATES PATENT OFFICE.

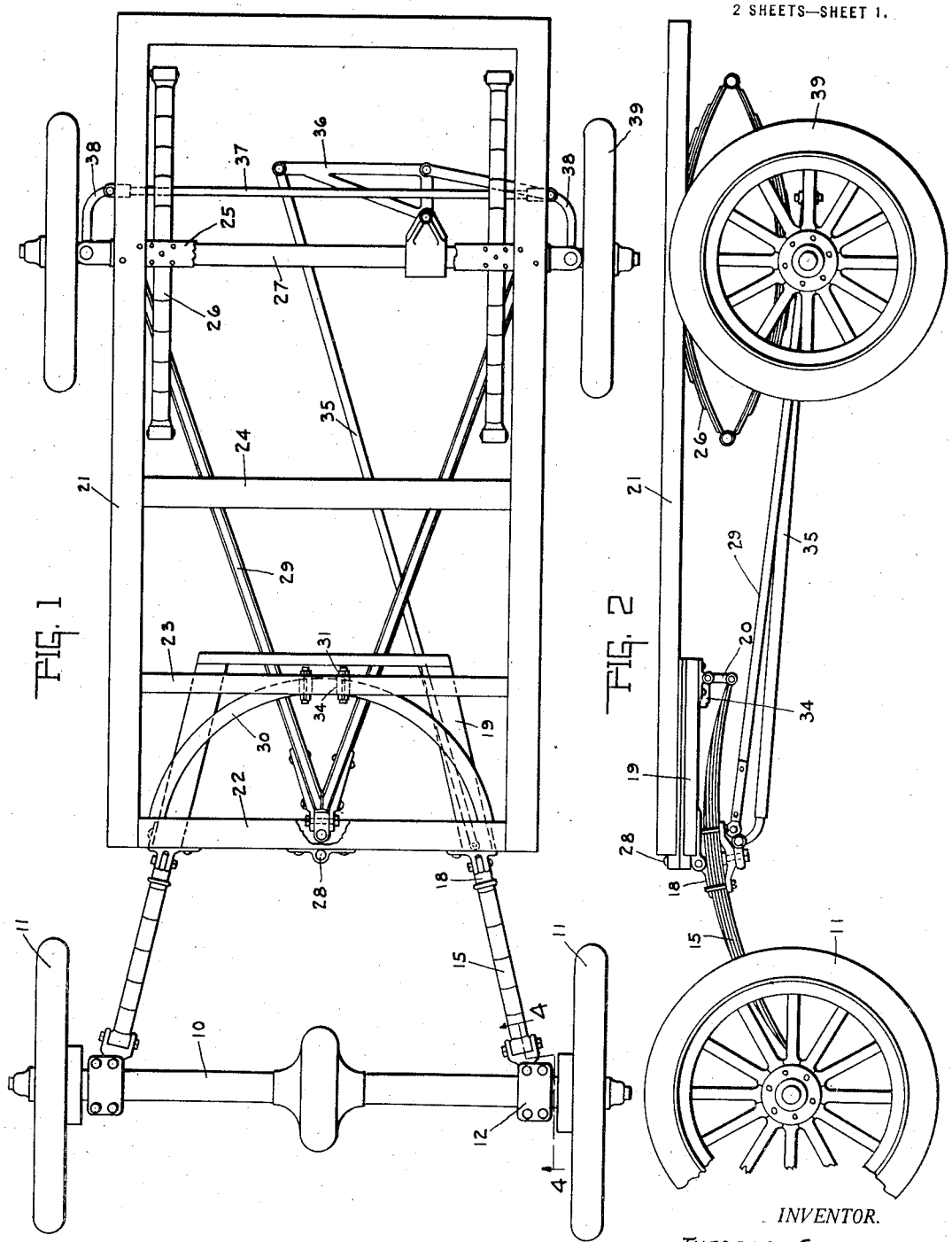

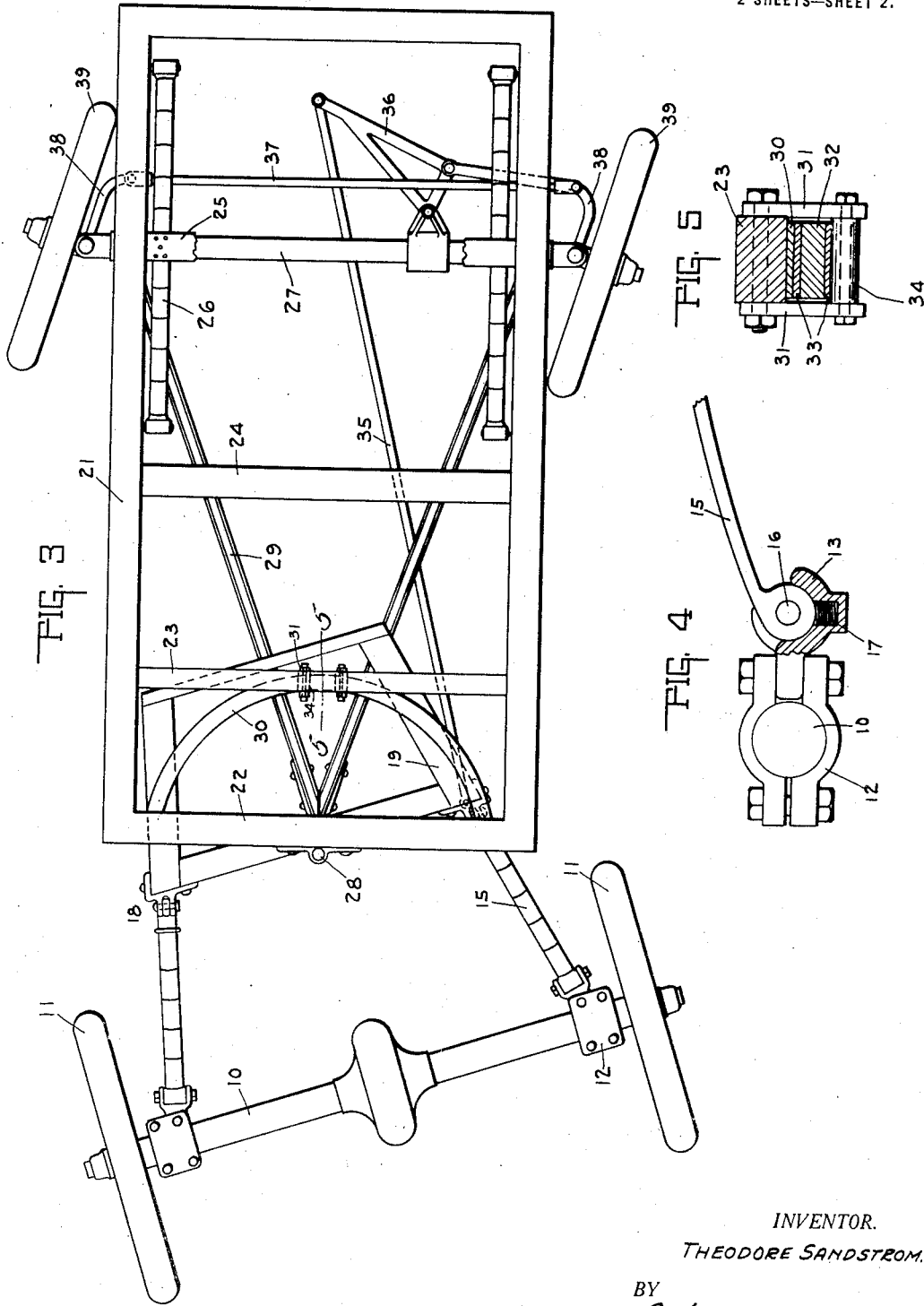

THEODORE SANDSTROM, OF INDIANAPOLIS, INDIANA.

TRAILER FOR MOTOR-DRIVEN VEHICLES.

1,343,790.  Specification of Letters Patent.  Patented June 15, 1920.

Application filed February 25, 1919. Serial No. 279,041.

*To all whom it may concern:*

Be it known that I, THEODORE SANDSTROM, a citizen of the United States, and a resident of Indianapolis, county of Marion, and State of Indiana, have invented a certain new and useful Trailer for Motor-Driven Vehicles; and I do hereby declare that the following is a full, clear, and exact description thereof, reference being had to the accompanying drawings, in which like numerals refer to like parts.

This invention relates to two wheel trailers for automobiles adapted to be directly supported at one end by the rear system of an automobile. The main object of the invention is to provide a trailer having only two wheels at the rear end thereof; and a spring construction at the front end thereof for attaching and supporting said trailer to the rear axle of an automobile or similar vehicle. The means for securing the trailer to the automobile consists of a spring construction adapted to take the place of the front spring of the four wheel trailer and yieldingly support the load thereon, at the same time forming the attaching means and being so constructed as to steer the rear wheels and cause them to follow in track, and permit the front end of the trailer to turn upon said spring support.

This is accomplished by a set of semi-elliptical springs secured at one end to the rear axle of the automobile and supporting a frame upon which the body frame of the trailer is pivotally secured so as to enable it to swing on the spring support when making a turn, while at the same time the rear wheels are actuated by the turning movement of the spring support so as to follow in the automobile track.

In the accompanying drawings which are made a part of this application Figure 1 is a plain view of the trailer connected to the rear axle of an automobile. Fig. 2 is a side elevation thereof. Fig. 3 is the same as Fig. 1, showing the trailer in a turning movement. Fig. 4 is an enlarged view of a cross section taken on the line 4—4 of Fig. 1. Fig. 5 is an enlarged view of a cross section taken on a line 5—5 of Fig. 3.

There is shown in the drawings a portion of the rear system of an automobile, having an axle 10 and rear driving wheels 11. Securely clamped to the rear axle 10 by means of a clamping member 12 there are supporting sockets 13 upon which the ends of the springs 15 are adapted to rest. A bolt 16 secures the end of the springs in said supporting socket, which is provided with a spiral compression spring 17 which bears against the end of said spring so as to prevent rattling in said socket. The springs 15 are bolted to clips 18 a little to the rear of their center, as shown in Fig. 2. The clips 18 are pivotally secured to the forward end of the frame 19. The rear ends of the springs 15 are pivotally secured to the rear portion of the frame 19 by the spring shackles 20, whereby the supporting frame 19 is yieldingly supported upon said springs.

The body frame 21 is provided with cross bars 22,—23,—24, and 25. The cross bar 25 is secured by a spring clip to the elliptical springs 26 which are supported upon the rear axle 27 of the trailer. The cross member 22 of said frame is pivotally secured to the frame 19 by the king pin 28, as shown in Fig. 3. The torque arms 29 are pivotally secured to the rear axle 27 and to the frame 19 so as to brace said axle in the ordinary manner.

Secured to the cross member 22 of said frame there is a substantially semi-circular plate 30 which extends directly under the cross member 23 as shown in Fig. 1 and between the supporting members 31 as shown in Fig. 5. Directly under the plate 30 and having the same radius thereof there is a sliding plate 32 having bearing surfaces 33, which extends between the side members of the supporting frame 19, and is rigidly secured thereto. Said sliding plate 32 is supported upon a roller 34 mounted between the members 31, whereby the sliding plates 32 will permit the turning movement of the frame 19 relative to the body frame 21 as shown in Fig. 3, and at the same time hold said frames in their relative positions.

Pivotally connected to one of the springs 15 there is a steering rod 35 which extends rearwardly and is pivoted to the bell crank 36, which is mounted on the rear axle 25 and connected to the spindle connecting rod 37, which is pivotally connected to the spindle arms 38 whereby the wheels 39 are properly steered so as to follow in track with the running gear of the automobile to which the trailer is attached, as shown in Fig. 3.

The clamping members 12 are permanently secured to the rear axle 10 and when it is desirable to attach or detach the trailer therefrom the bolts 16 are simply removed and the springs 15 lifted out of the supporting sockets 13. It will be seen by the preceding description that the front wheels of the trailer may be completely done away with, without losing the advantages of the front springs and turning and steering effect found in the four wheeled trailer.

The invention claimed is:

1. The combination with a vehicle, of a trailer including a body, an axle for supporting the rear end of the body, steering wheels carrying said axle, a frame coupled with the rear axle of the vehicle near each rear wheel thereof and pivotally connected to the front part of the body of the trailer and arranged so as to support the same, and steering means connected with one side of said coupling frame and extending back to the steering wheels for automatically steering them so as to cause them to follow in track with said vehicle.

2. The combination with a vehicle, of a trailer including a body, an axle for supporting the rear end of the body, steering wheels carrying said axle, springs coupled to the rear end of the vehicle near each side thereof and extending rearwardly under said trailer body, a frame secured to said springs and pivoted centrally to the front end of the trailer body, means for holding said frame from vertical movement independently of the trailer but which permits lateral oscillation thereof, and means pivotally connected with one of said springs for steering the steering wheels of the trailer.

3. The combination with a vehicle, having a rear axle, of a two wheel trailer including a frame, a pair of steering wheels, a pair of front spring members, supporting members clamped to the axle of said vehicle in which one end of said springs is pivotally secured, a rigid frame mounted on the other end of said springs, a substantially semicircular bearing plate secured on said trailer frame, a roller suspended from said trailer frame, a sliding plate mounted on said spring frame, and adapted to slide between said bearing plate and roller when said trailer turns thereon, whereby the forward end of said trailer is pivotally supported upon said springs, a steering rod fixed to said springs, a tie rod pivoted to the steering knuckles of said wheels, and a steering crank pivoted to said steering rod and tie rod for causing said wheels to be automatically steered by the change in direction of said springs caused by said vehicle.

In witness whereof I have hereunto affixed my signature.

THEODORE SANDSTROM.